United States Patent [19]

Schmidt et al.

[11] Patent Number: 4,542,342
[45] Date of Patent: Sep. 17, 1985

[54] APPARATUS FOR MEASURING PROJECTILE'S TRANSVERSE DISPLACEMENT AT GUN MUZZLE

[75] Inventors: Jimmy Q. Schmidt, Baltimore; Rurik K. Loder, Havre de Grace, both of Md.

[73] Assignee: The United States of America as represented by the Secretary of the Army, Washington, D.C.

[21] Appl. No.: 418,325

[22] Filed: Sep. 15, 1982

[51] Int. Cl.[4] ........................ G01B 7/14; G01P 3/66
[52] U.S. Cl. .................................... 324/207; 324/179
[58] Field of Search ............... 324/207, 208, 179, 236; 73/167

[56] References Cited

U.S. PATENT DOCUMENTS 4,228,397 10/1980 Schmidt .............................. 324/179
4,422,041 12/1983 Lienau ................................ 324/208

Primary Examiner—Gerard R. Strecker
Assistant Examiner—Walter E. Snow
Attorney, Agent, or Firm—Anthony T. Lane; Robert P. Gibson; Michael C. Sachs

[57] ABSTRACT

A multi-segmented radio frequency excited inductance coil sensor is operatively disposed on the muzzle end of a gun tube for the purpose of detecting the transverse displacement of a projectile from the center axis of the gun tube. The apparatus comprises a combination of sum and differencing amplifiers which combine detected signals into a form which can be used to compute the angle and magnitude of displacement.

7 Claims, 14 Drawing Figures

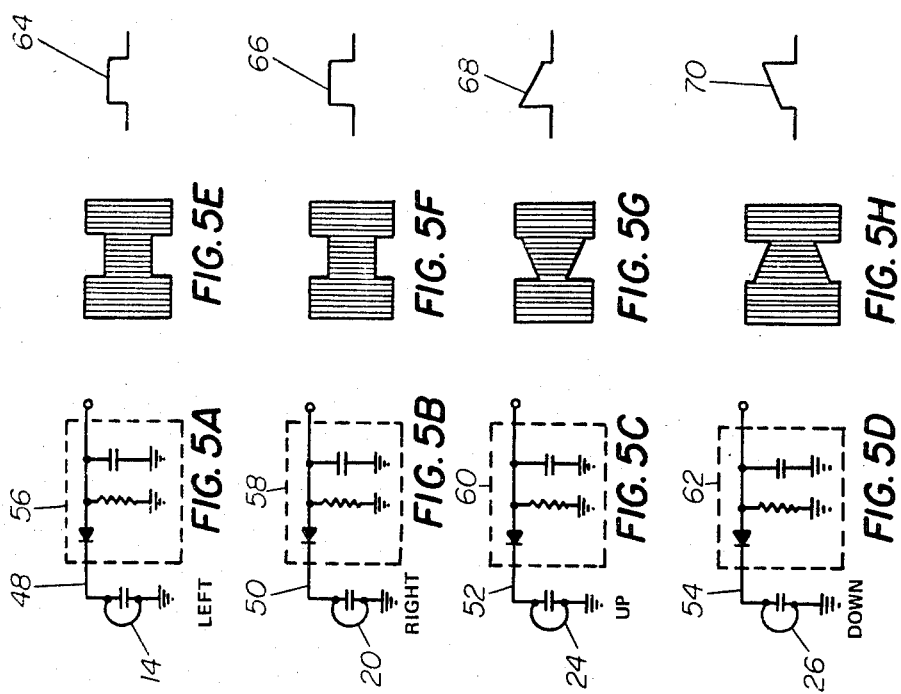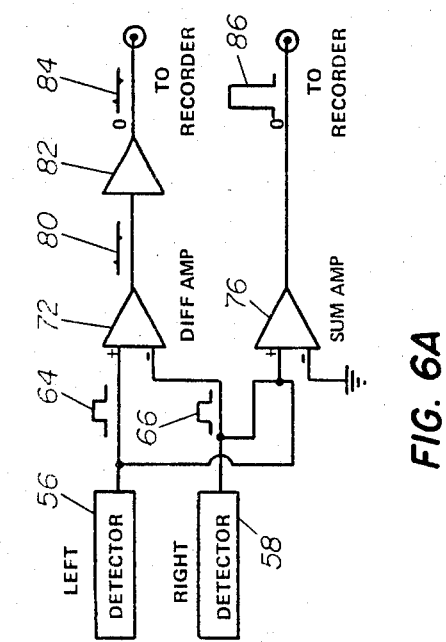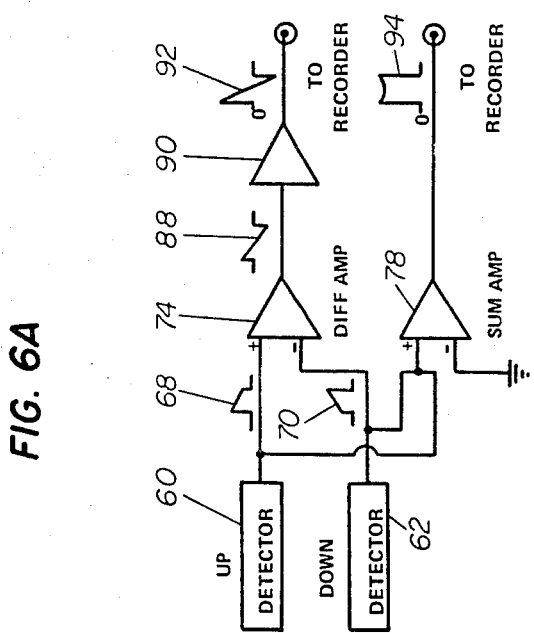

APPARATUS FOR MEASURING PROJECTILE'S TRANSVERSE DISPLACEMENT AT GUN MUZZLE

GOVERNMENTAL INTEREST

The invention described herein may be manufactured, used and licensed by or for the Government for governmental purposes without the payment to us of any royalty thereon.

BACKGROUND OF THE INVENTION

1. Field of the Invention

This invention relates to an apparatus which graphically demonstrates the angle and magnitude of displacement of a projectile in relationship to the bore axis of a gun at the precise instant the projectile exits from the muzzle. The present invention also provides means for monitoring the structural integrity of the projectile in the proximity of the muzzle.

2. Description of the Prior Art

Various means have been used in the past to measure the parameters that relate to improvement of a gun's accuracy. Among these parameters, it has been established that excessive yaw and pitch at the muzzle exit can affect the free flight trajectory of the projectile and may in many instances be indicative of gun tube wear and other projectile-gun tube interface problems. Thus, knowledge of the initial orientation (yaw and pitch) characteristics of the projectile can result in refinement of projectile design to provide increased accuracy. With the recent increased emphasis in high performance gun-projectile systems, which are costly to manufacture, knowledge of the structural integrity of the projectile at launch becomes increasingly important.

Normally because of the tight tolerances between a projectile and its gun tube, the angles of yaw and pitch are quite small. In the past, these small angles of yaw and pitch have been difficult to detect by photographic methods. X-ray photographs are not suitable for this purpose because they are not sufficiently well-defined to see a small angle. Use in the past of regular photography has been unsatisfactory in many instances, because the projectile is usually obscured by smoke and blast effects. Use of lasers or a multiple interferometer system to observe the projectile is also not practical because of smoke and blast obscurant effect. Another problem with use of the aforementioned devices to measure projectile yaw and pitch angle at the muzzle is that they are relatively expensive and require a fixed mounting and realignment whenever the gun firing angle is changed.

SUMMARY OF THE INVENTION

The present invention includes a plurality of orthogonally disposed sensor coils, fixedly attached to the muzzle end of a gun, which are electrically coupled to a radio frequency oscillator. The coils are positioned so that when the projectile passes therethrough, the inductive coupling produces electrical signals proportional to the proximity of the projectile to each segment of the sensor. These electrical signals when sensed by a plurality of amplitude detectors are fed to differential and summing amplifiers whose outputs are then electrically coupled to a recording means for signal observation and to a computer for computation of angle and magnitude of the projectile alignment.

An object of the present invention is to provide an apparatus for measuring projectile transverse displacement at a gun muzzle which has the sensitivity of measuring angles of yaw and pitch in fractions of degrees.

Another object of the present invention is to provide an apparatus wherein transverse displacement of projectile components or deformation can be measured in the order of 0.1 mm.

Another object of the present invention is to provide an apparatus for measuring projectile transverse displacement at a gun muzzle which can be easily integrated into a small computer system for the computation of angle and magnitude values.

Another object of the present invention is to provide an apparatus for measuring projectile transverse displacements at gun muzzle wherein the sensor means and associated circuitry are simple and inexpensive to manufacture.

A further object of the present invention is to provide an apparatus for measuring projectile transverse displacement at a gun muzzle wherein there is no restriction on the firing angle of the gun.

For a better understanding of the present invention, together with other and further objects thereof, reference is made to the following descriptions taken in connection with the accompanying drawings.

BRIEF DESCRIPTION OF THE DRAWINGS

FIGS. 5A-D are schematic drawings of amplitude detector circuits.

FIGS. 5E-H show representative waveforms obtained from the output of detector circuits of FIGS. 5A-D respectively.

FIGS. 6A-B are an electrical schematic diagram of amplitude detected pulses electrically coupled to differential and summing amplifiers.

Throughout the following description like reference numerals are used to denote like parts of the drawings.

DESCRIPTION OF THE PREFERRED EMBODIMENTS

Figure 1:
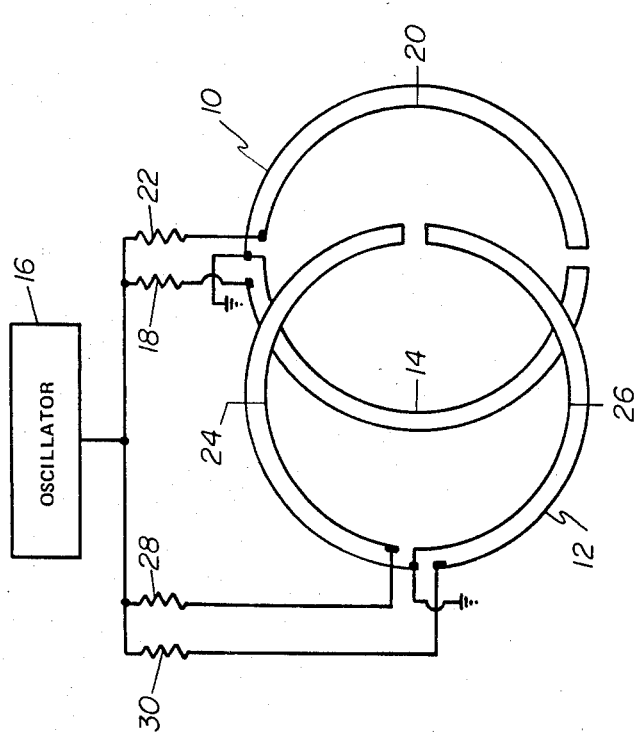
FIG. 1 is a schematic view of the two segment sensor coils, orthogonally positioned and electrically coupled to an oscillator.

Referring now to FIG. 1, two identical two-segmented coils 10 and 12 may be fabricated from standard printed circuit board, not shown. Coils 10 and 12 are positioned so that they are oriented 90° with respect to each other. Coil 10 has a left coil segment 14 electrically connected to an oscillator 16 thru an isolation resistor 18 and a right coil segment 20 coupled to oscillator 16 via isolation resistor 22. Coil 12 in a similar manner has a up coil segment 24 and a down coil segment 26 electrically coupled to oscillator 16 via isolation resistors 28 and 30.

Figure 2:
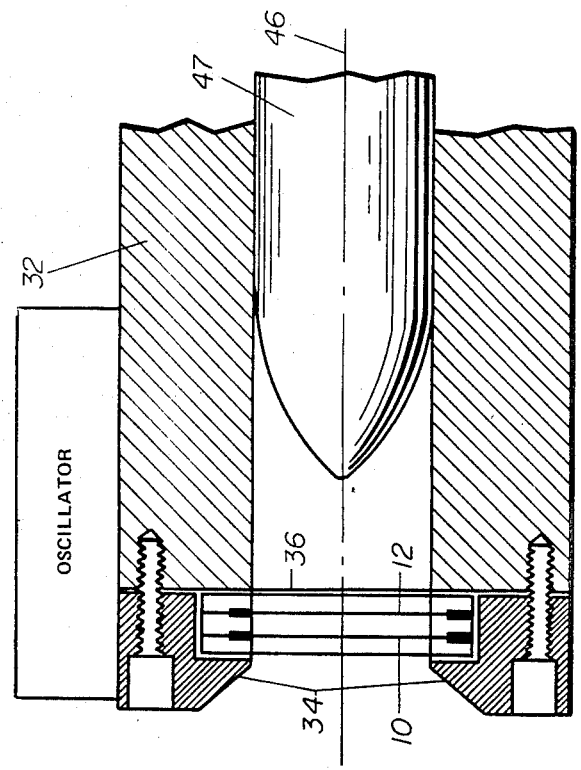
FIG. 2 is a cross-sectional view of the sensor coils and oscillator mounted on the gun tube muzzle.
Figure 3:
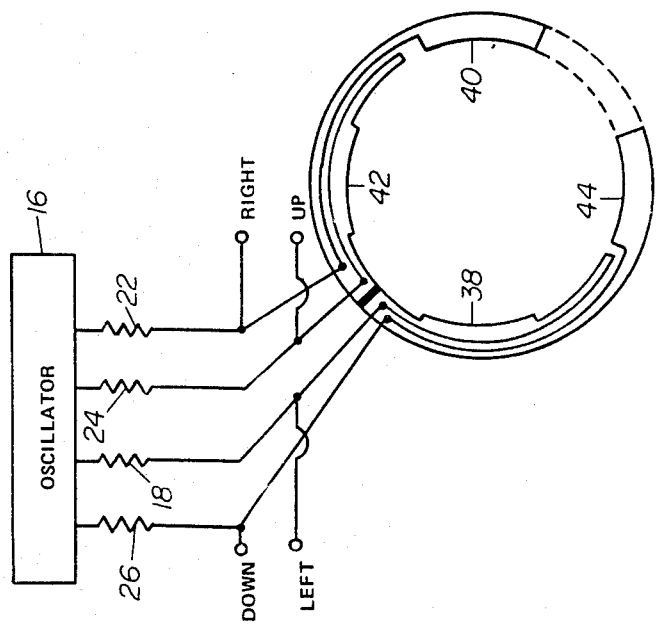
FIG. 3 is a four-segmented sensor coil in which all four segments are in the same longitudinal plane.

Referring to FIG. 2, sensor coils 10 and 12 are orthogonally fixedly positioned by an epoxy with respect to each other in the muzzle end of gun tube 32 in a mounting collar 34. An annularly shaped Teflon seal 36 is used between the sensor coils 10 and 12, and gun tube 32 to prevent high-pressure propellant gases from leaking between the sensor coils 10, 12 and the gun tube 32. With the design shown in FIG. 2, there is a slight time differential between the detected signals which must be taken into account in the data analysis. FIG. 3, is a modification of the design configuration in which all four orthogonally disposed coil segments 38, 40, 42 and 44 are disposed in the same longitudinal plane. This latter design eliminates the aforementioned time differential, but has less sensitivity than the sensors shown in FIGS. 1 and 2.

Referring again to FIG. 2, it can be seen that if the sensors are oriented as shown coil segment 14 can be used to detect the proximity of a projectile to the left of the center longitudinal axis 46.

Figure 4:
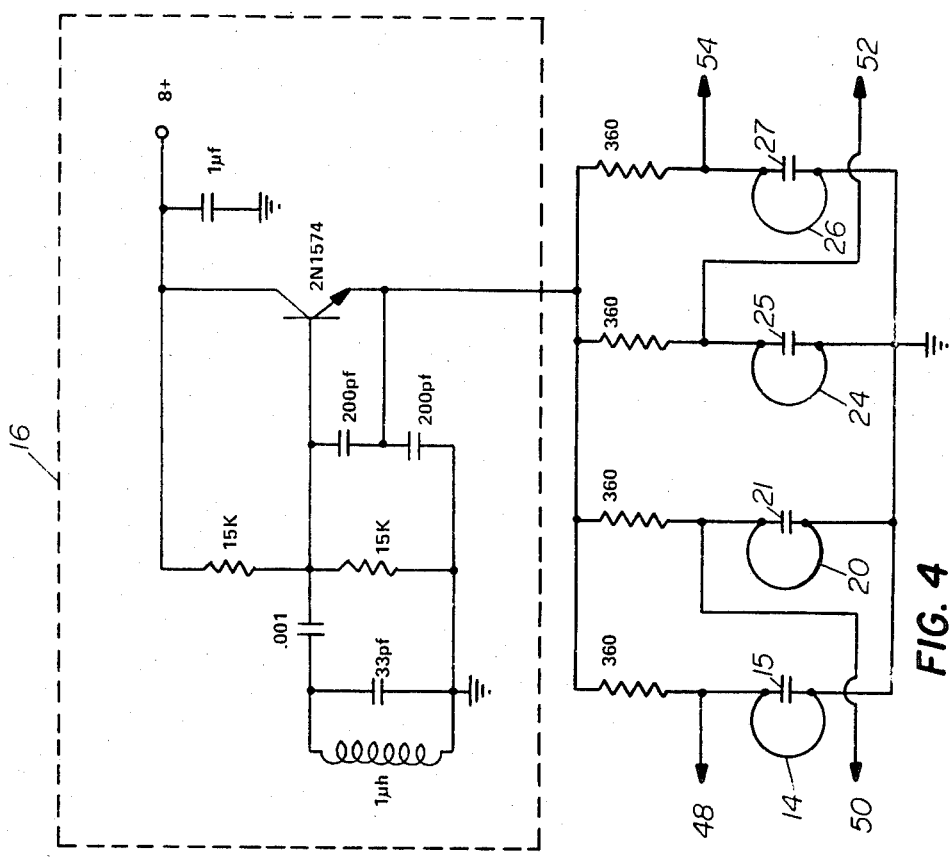
FIG. 4 is an electrical schematic diagram showing how the coil segments are electrically connected to an RF oscillator circuit.

In operation, a electromagnetic signal is induced in each segment 14, 20, 24 and 26 in the same manner as previously disclosed in U.S. Pat. No. 4,228,397. Referring now to FIG. 4, the four coil segments 14, 20, 24 and 26 and their parallel connected capacitors 15, 21, 25, and 27, respectively, are electrically coupled to the RF oscillator circuit 16. Each coil segment 14, 20, 24 and 26 is resonated at approximately the oscillator 16 frequency and partially isolated from the oscillator 16 by isolation resistors 18, 22, 28 and 30, respectively. An electromagnetic field is radiated continuously from coil segments 14, 20, 24 and 26. As a projectile 47, shown in FIG. 2, passes through the coils 10 and 12, the electromagnetic radiation induces eddy currents in the projectile body, which in turn radiates back into the sensor segments 14, 20, 24 and 26. These signals cause an impedance transformation in the circuit which is reflected as a change in the radio frequency level impressed across coil segments 14, 20, 24 and 26. The magnitude of the RF signal level change is a function of the distance between the sensor segments 14, 20, 24 and 26 and the projectile. The closer the projectile is to the particular coil segment, the stronger the coupling, and the greater is the impedance transformation.

Referring now to FIGS. 4 and 5A–5D, the resulting change in RF signal level 48, 50, 52 and 54 across each coil segment 14, 20, 24 and 26 is amplitude detected by conventional diode detectors circuits 56, 58, 60 and 62, respectively. As a result of the projectile passing through the sensor segments, four pulses are generated with the amplitude being a function, at any given point of time, of the distance from the projectile to the sensor segment. For illustration purposes in this instance, a cylindrically shaped projectile is contemplated, which is equidistant from left and right sensors segments 14 and 20. Thus, the amount of amplitude modulation shown in FIGS. 5E and 5F and the two output pulses 64, 66, respectively, generated therefrom are the same. Also for illustrative purpose, the projectile is contemplated as being cocked in a vertical plane with the leading edge closer to the "up" sensor segment 24. The amount of RF modulation in this instance is therefore greater at the leading edge of the modulated signal shown in FIG. 5G. As the projectile passes the sensor segment 24, the contemplated projectile's trailing edge will be closer to the "down" sensor segment 26 resulting in output pulses 68 and 70 after detection by diode detectors 60 and 62, respectively.

Referring now to FIGS. 6A and 6B, the four detected output pulses 64, 66, 68 and 70 are electrically coupled to two low gain, wide band differential amplifiers 72 and 74 and two summing amplifiers 76 and 78. The two output pulses 64 and 66 from the left and right sensor segments 14 and 20 are coupled to the non-inverting and inverting inputs of the differential amplifier and to the non-inverting input of the summing amplifiers 72 and 76, respectively. Since signals 64 and 66 are equal, they are canceled in differential amplifier 72 and result in a no output signal 80. If the projectile had been displaced to the left, a positive output would have been obtained, and if it were displaced to the right, a negative output signal would have been obtained. A second amplifier 82 provides additional gain for whatever signal is present to increase the "left-right" sensor differential output signal 84 to a suitable level for recording. The two pulses 64 and 66 are also electrically coupled to summing amplifier 76, which generates an amplified "left-right" sensor summing pulse 86 representing the sum of the two input pulses 64 and 66. Thus, two output pulses are obtained from the left/right sensor segment circuits. One output pulse is the difference signal 84, the polarity of which indicates the direction of the projectile's displacement relative to the center axis 46 of the gun tube 32. The amplitude of signal 84 being proportional to the amount of the projectile's displacement from axis 46. The second output signal 86 represents the total integrated signal developed by the left and right sensor segments 14 and 20, and is used for the computation of the angle and the magnitude of the displacement.

In a similar fashion, pulses 68 and 70 from the up/down detectors 60, 62 are fed to the non-inverting and inverting inputs of a second differential amplifier 74 and to a second summing amplifier 78. In this example, since the contemplated projectile has a pitch "up", the detector output signals 68 and 70 are different. The differential amplifier 74 will cancel the equal components and amplify any difference. The unequal component of signal 68 is amplified without phase in version, while the unequal component of signal 70 is amplified and inverted by 180°. The output pulse 88 of the second differential amplifier 74 indicates the pitch of the projectile. The leading edge of the output pulse 88 of the second differential amplifier 84 is positive and gradually decreases to zero, then increases to a negative peak, and then returns to zero after the projectile passes the "up" and "down" sensor segments 24 and 26, respectively. Pulse shape 88 corresponds to the up pitch of the projectile where the leading edge of the projectile is closer to the "up" sensor segment 24 and the trailing edge of the projectile is closer to the "down" sensor segment 26. Pulse 88 is then coupled to amplifier 90 to provide an amplified "up-down" differential output pulse 92 suitable for recording. Similarly detected pulses 68 and 70 are also fed to the second summing amplifier 78 which provides up-down summing output pulse 94 for use in the computation of angle and magnitude of displacement of the projectile from the gun tube center axis 46.

The four output pulses 84, 86, 92 and 94 may be recorded on two dual channel digital oscilloscopes, not shown, and then coupled by techniques well known in the art to a computer for the computation of angle of displacement and its magnitude. Since yaw or pitch is the magnitude of displacement as a function of time, the angle of yaw or pitch can also be computed if desired.

If one of the summed signals is fed into a logic circuit, which provides a measure of time it takes for the projectile to pass the sensor coils, the muzzle velocity of the projectile can be readily computed.

While there has been described and illustrated specific embodiments of the invention, it will be obvious that various changes, modifications and additions can be made herein without departing from the field of the invention which should be limited only by the scope of the appended claims.

Having thus fully described the invention, what is claimed as new and desired to be secured by Letters Patent of the United States is:

1. An apparatus for measuring a projectile's transverse displacement at muzzle exit of a gun tube which comprises:
   first coil means for electromagnetically sensing relative proximity and "left" and "right" displacement of said projectile in terms of currents induced by the mechanical motion of said projectile;
   second coil means for electromagnetically sensing relative proximity and "up" and "down" displacement of said projectile in terms of currents induced by the mechanical motion of the said projectile;
   oscillator means for providing an RF signal to said first and second coil means;
   means for electrically coupling said oscillator means to said first and second coil means;
   means for fixedly holding said first and second coil means to the muzzle end of said gun tube, and for orienting said first and second coil means in an orthogonal position to each other;
   first detector means electrically coupled to said first coil means for amplitude detecting changes in RF signals generated across a "left" sensor segment of said first coil means, and for generating a "left" output pulse;
   second detector means electrically coupled to said first coil means for amplitude detecting changes in RF signals generated across a "right" sensor segment of said first coil means, and for generating a "right" output pulse;
   third detector means electrically coupled to said second coil means for amplitude detecting changes in RF signals generated across an "up" sensor segment of said second coil means, and for generating an "up" output pulse;
   fourth detector means electrically coupled to said second coil means for amplitude detecting changes in RF signals generated across a "down" sensor segment of said second coil means, and for generating a "down" output pulse;
   first differential amplifier means for generating a left-right differential output signal which is a function of the difference in amplitude of said "left" and "right" output pulses;
   first summing amplifier means for generating a left-right summing output signal which is a function of the sum of said "left" and "right" output pulses;
   second differential amplifier means for generating an up-down differential output signal which is a function of the difference in amplitude of said "up" and "down" output pulses; and
   second summing amplifier means for generating an up-down summing output signal which is a function of the sum of said "up" and "down" output pulses;
   wherein said "left-right", up-down differential output signals and said left-right and up-down summing signals are recorded for computation of angle and magnitude of displacement of said projectile in relationship to the bore axis of said gun tube.

2. An apparatus as recited in claim 1 wherein said first coil means includes:
   a first semicircular "left" coil segment electrically coupled to said oscillator means.

3. An apparatus as recited in claim 2 wherein said second coil means includes:
   a second semicircular right coil segment electrically coupled to said oscillator.

4. An apparatus as recited in claim 3 wherein said means for electrically coupling includes:
   an isolation resistor element electrically disposed in series with each of said "left", "right", "up", and "down" coil segments.

5. An apparatus as recited in claim 4 wherein said means for fixedly holding said first and second coil means to the muzzle end of said gun tube includes:
   a mounting collar threadably attached or clamped to the muzzle end of said gun tube; and
   an annularly shaped Teflon seal operatively disposed intermediate said second coil means and said muzzle end of said gun tube.

6. An apparatus as recited in claim 5 wherein said first, second, third and fourth detector means include an amplitude diode detector electrically coupled to each of said "left", "right", "up", and "down" coil segments, respectively.

7. An apparatus as recited in claim 6 wherein said first and second coil means include four orthogonally disposed coil segments operatively disposed in a single longitudinal plane.

* * * * *